(12) United States Patent
Musa et al.

(10) Patent No.: US 12,478,699 B2
(45) Date of Patent: Nov. 25, 2025

(54) STERILIZATION PARTICLE CONTAINING A STERILIZATION MATERIAL

(71) Applicant: Delox—Investigação, Processos e Equipamentos Científicos, LDA, Cascais (PT)

(72) Inventors: Fadhil Yussof Musa, Cascais (PT); Fernando José Nunes Antunes, Cascais (PT); João Manuel Pires da Silva, Cascais (PT)

(73) Assignee: Delox—Investigação, Processos e Equipamentos Científicos, LDA, Cascais (PT)

( * ) Notice: Subject to any disclaimer, the term of this patent is extended or adjusted under 35 U.S.C. 154(b) by 1094 days.

(21) Appl. No.: 17/431,912

(22) PCT Filed: Feb. 19, 2020

(86) PCT No.: PCT/IB2020/051385
§ 371 (c)(1),
(2) Date: Aug. 18, 2021

(87) PCT Pub. No.: WO2020/170159
PCT Pub. Date: Aug. 27, 2020

(65) Prior Publication Data
US 2022/0143246 A1 May 12, 2022

Related U.S. Application Data

(60) Provisional application No. 62/949,612, filed on Dec. 18, 2019, provisional application No. 62/807,393, filed on Feb. 19, 2019.

(51) Int. Cl.
*A61L 2/20* (2006.01)
*A61L 2/00* (2006.01)
*A61L 2/235* (2006.01)

(52) U.S. Cl.
CPC ............. *A61L 2/202* (2013.01); *A61L 2/0094* (2013.01); *A61L 2/208* (2013.01); *A61L 2/235* (2013.01);
(Continued)

(58) Field of Classification Search
CPC ........ A61L 2/0094; A61L 2/202; A61L 2/208; A61L 2/235; A61L 2202/21; A61L 2202/24; A61L 2202/25
See application file for complete search history.

(56) References Cited

U.S. PATENT DOCUMENTS 2,986,448 A   5/1961   Gates et al.
3,480,557 A   11/1969  Shiraeff
(Continued)

FOREIGN PATENT DOCUMENTS

EP   1121980 A1   8/2001
EP   1557181 A1   7/2005
(Continued)

OTHER PUBLICATIONS

Bing et al. Magnetic microsphere to remove tetracycline from water: Adsorption, H2O2 oxidation and regeneration, Chemical Engineering Journal, 2017, vol. 330, pp. 191-201.
(Continued)

*Primary Examiner* — Timothy C Cleveland
(74) *Attorney, Agent, or Firm* — The Webb Law Firm

(57) ABSTRACT

A sterilization particle includes a porous carrier material having at least one of the following: a microporous material, a mesoporous material, a macroporous material, or a combination thereof; and a sterilization material contained in pores of the porous carrier material or adsorbed on a surface of the porous carrier material. The sterilization material includes at least 4 weight percent of the sterilization particle. A sterilization device, a method for preparing a sterilization (Continued)

particle, and a method for sterilizing a space are also disclosed.

20 Claims, 10 Drawing Sheets

(52) U.S. Cl.
CPC ....... *A61L 2202/21* (2013.01); *A61L 2202/24* (2013.01); *A61L 2202/25* (2013.01)

(56) References Cited

U.S. PATENT DOCUMENTS

| | | | |
|---|---|---|---|
| 3,870,783 | A | 3/1975 | Hall et al. |
| 4,839,157 | A | 6/1989 | Ng et al. |
| 4,891,211 | A | 1/1990 | Winston |
| 5,077,047 | A | 12/1991 | Biss et al. |
| 5,667,753 | A | 9/1997 | Jacobs et al. |
| 5,674,450 | A | 10/1997 | Lin et al. |
| 5,770,739 | A | 6/1998 | Lin et al. |
| 5,820,841 | A | 10/1998 | Chen et al. |
| 5,876,666 | A | 3/1999 | Lin et al. |
| 8,889,044 | B2 | 11/2014 | Yano et al. |
| 2003/0044314 | A1* | 3/2003 | Aamodt ............... A61L 2/22 422/27 |
| 2005/0109981 | A1* | 5/2005 | Tucker .................. A62D 3/38 252/186.38 |
| 2016/0051928 | A1 | 2/2016 | Spiegelman et al. |
| 2019/0037839 | A1 | 2/2019 | Preslar et al. |

FOREIGN PATENT DOCUMENTS

| | | |
|---|---|---|
| EP | 1646708 A2 | 4/2006 |
| JP | 2005289941 A | 10/2005 |
| JP | 4921649 B2 | 4/2012 |
| WO | 2004104154 A2 | 12/2004 |

OTHER PUBLICATIONS

Dabrowski et al. Colloids and Surfaces A: Physicochem. Eng. Aspects 212, 2003, 109-114.

Giaya et al. "Liquid and vapor phase adsorption of chlorinated volatile organic compounds on hydrophobic molecular sieves", Microporous and Mesoporous Materials 40 (2000) 205-218.

Goncalves et al. "Adsorption of hidrogen peroxide on the surface of silica—titania mixed oxide obtained by the sol-gel processing method", Ecl. Quim., Sao Paulo, 32(2): 41-45, 2007.

S. Kwon et al., Silica-based mesoporous nanoparticles for controlled drug delivery, Sep. 2013, vol. 4.

D. Lewandowski, Adsorption of hydrogen peroxide on functionalized mesoporous silica surfaces, Structural Chemistry, Oct. 2014, vol. 25, Issue 5, pp. 1505-1512.

Y. Lv et al. Adsorption behaviors and vibrational spectra of hydrogen peroxide molecules at quartz/water interfaces Phys.Chem.Chem. Phys. Feb. 2017, vol. 19, pp. 7054.

McDonnell, "The Use of Hydrogen Peroxide for Disinfection and Sterilization Applications", Peroxides (Apr. 2014) (https://doi.org/10.1002/9780470682531.pat0885.

Pham et al., Activation of Hydrogen Peroxide by Iron-Containing Minerals and Catalysts in Circumneutral pH Solutions: Implications for ex situ and in situ Treatment of Contaminated Water and Soil, 2012 UC Berkeley Thesis.

M. Pradhan et al., Heterogeneous uptake of gaseous hydrogen peroxide by Gobi and Sahara dust aerosols: a potential missing sink for H2O2 in the troposphere, Atmospheric Chemistry and Physics, Aug. 2010, vol. 10, pp. 7127-7136.

V.P.G Sripathi et al, Vapor phase versus liquid phase grafting of meso-porous alumina, May 2013, vol. 172, pp. 1-6.

Y. Wolanov et al., Aqueous stability of alumina and silica perhydrate hydrogels: experiments and computations, Dalton Trans., Jun. 2014, vol. 43, pp. 16614.

Zeglinski et al.: "Silica xerogel-hydrogen peroxide composites: Their morphology, stability, and antimicrobial activity", Colloids and Surfaces. B, Biointerfaces, Elsevier, Amsterdam, NL, vol. 54, No. 2, Jan. 25, 2007 (Jan. 25, 2007), pp. 165-172, XP005858724, ISSN: 0927-7765, DOI: 10.1016/J.COLSURFB.2006.10.013.

Y. Zhao, et al., Kinetics and Mechanisms of Heterogeneous 25 Reaction of Gaseous Hydrogen Peroxide on Mineral Oxide Particles, Environ. Sci. Technol., Mar. 2011, vol. 45, pp. 3317-3324.

Sudur et al., "Hydrogen Peroxide Stability in Silica Hydrogels," Industrial & Engineering Chemistry Research, 2015, pp. 1930-1940, vol. 54(6).

\* cited by examiner

STERILIZATION PARTICLE CONTAINING A STERILIZATION MATERIAL

CROSS-REFERENCE TO RELATED APPLICATIONS

This application is the United States national phase of International Application no. PCT/IB2020/051385 filed Feb. 19, 2020, and claims the benefit of U.S. Provisional Application Nos. 62/807,393, filed Feb. 19, 2019, and 62/949,612, filed Dec. 18, 2019, the disclosures of which are hereby incorporated in their entireties by reference.

BACKGROUND

Field

The present disclosure is directed to a sterilization particle, a sterilization device, a method of preparing a sterilization particle, and a method of sterilizing a space.

Technical Considerations

Sterilization materials, such as hydrogen peroxide, are highly versatile oxidants with broad industrial applications. Within biomedical and pharmaceutical fields, sterilizing applications are apparent because the sterilization material provides potent germicidal efficacy and potential for terminal sterilization (6 orders of magnitude reduction in contaminant microorganisms, including highly resistant bacterial spores). Sterilization processes using certain sterilization materials leave no toxic residue, as such sterilization materials decay in water and oxygen, permitting an environmentally friendly anti-microbial agent.

Hydrogen peroxide vaporization and nebulization (atomization, dispersion) are two commonly used procedures to sterilization of surfaces and spaces. Nebulization or atomization of hydrogen peroxide, although a dispersion, also relies on liquid hydrogen peroxide. In opposition, vaporization of hydrogen peroxide relies on the more effective hydrogen peroxide vapor. Devices that allow vaporization are complex and expensive, while nebulization devices are simpler, compact and less expensive, but not as effective. To solve current market problems, a device that releases hydrogen peroxide that effectively sterilizes, while retaining the characteristics of nebulization devices, is desirable. The complexity of the vaporization systems is related to the difficulty in vaporizing the sterilant from the sterilization materials. Lower energy bonds between hydrogen peroxide molecules and carrier materials in the sterilant material are desired to facilitate the hydrogen peroxide release into gas phase. On the other hand, if this bond between the hydrogen peroxide molecules and carrier materials is indeed weak, it is not expected to have a sterilant material containing a large amount of hydrogen peroxide, unless almost pure hydrogen peroxide is used in the production process, which introduces security and economic drawbacks.

SUMMARY

The present disclosure provides a sterilization particle that at the same time carries a high amount of hydrogen peroxide, but that also allows an easy release of hydrogen peroxide into the gas phase, while also enabling the development of simple and compact devices that perform effective sterilization. The system may use temperature as a trigger, rendering complex vaporization systems obsolete and allowing its utilization in compact release devices. The economic side of the materials and processes used to synthesize the improved particle is of relevance, and the sterilization particle disclosed herein may be recyclable.

The present disclosure also provides a solution that may include a solid sterilant. The improved sterilization particle may carry a large amount of the sterilant, in which an adsorption-desorption process occurs to later release desorbed sterilant, equally effective to vaporized hydrogen peroxide.

Accordingly, and generally, provided is an improved sterilization particle, a sterilization device containing the improved sterilization particle, a method of preparing the sterilization particle, and a method of sterilizing a space using the sterilization particle.

According to some non-limiting embodiments or aspects, a sterilization particle includes: a porous carrier material including at least one of the following: a microporous material, a mesoporous material, a macroporous material, or a combination thereof; and a sterilization material contained in pores of the porous carrier material or adsorbed on a surface of the porous carrier material. The sterilization material includes at least 4 weight percent of the sterilization particle.

In some non-limiting embodiments or aspects, the sterilization material may include at least one of the following: hydrogen peroxide, peracid, ozone, or a combination thereof. The sterilization material may include at least 10 weight percent of the sterilization particle. The porous carrier material may include at least one of the following: silica-based material, silica-alumina, alumina, or a combination thereof. The silica-based material may include a silica gel, and may be a non-functionalized material for economic reasons. The porous carrier material may include an organic-based material. The organic-based material may include acrylate. The sterilization material may be loaded into the pores as a gas. A partial pressure of the sterilization material in the gas may be at least 0.1 mmHg. The sterilization material may be contained in the pores so as to be released from the pores and into surroundings of the sterilization particle at a temperature below 120° C. The sterilization material may be contained in the pores so as to be released from the pores and into surroundings of the sterilization particle at an absolute pressure lower than normal atmospheric pressure. The sterilization material may be contained in the pores so as to be released from the pores and into surroundings of the sterilization particle at normal atmospheric pressure. The sterilization material may be contained in the pores so as to be released from the pores and into surroundings of the sterilization particle without contacting the sterilization particle with water.

According to some non-limiting embodiments or aspects, a sterilization device containing the sterilization particle includes: a porous carrier material including at least one of the following: a microporous material, a mesoporous material, a macroporous material, or a combination thereof; and a sterilization material contained in pores of the porous carrier material or adsorbed on a surface of the porous carrier material. The sterilization material includes at least 4 weight percent of the sterilization particle.

According to some non-limiting embodiments or aspects, a method of preparing a sterilization particle includes: providing a porous carrier material including at least one of the following: a microporous material, a mesoporous material, a macroporous material, or a combination thereof; and exposing the porous carrier material to a gas including a gaseous sterilization material to form a sterilization particle. The porous carrier material is exposed to the gaseous sterilization material under conditions sufficient to introduce the gaseous sterilization material into pores of the porous carrier material or to adsorb the gaseous sterilization material on a surface of the porous carrier material, such that the sterilization material includes at least 4 weight percent of the sterilization particle.

In some non-limiting embodiments or aspects, the porous carrier material may be exposed to the gaseous sterilization material at a temperature of up to 200° C. for from 6 hours to 10 days. Before exposing the porous carrier material to the gaseous sterilization material, the porous carrier material may be heated to a temperature of up to 500° C. for up to 1 minute. Before exposing the porous carrier material to the gaseous sterilization material, the porous carrier material may be heated to a temperature of up to 300° C. for at least 1 minute. Previously used porous carried material can be recycled by these heat-exposing steps. The method may include drying the porous carrier material before exposing the porous carrier material to the gaseous sterilization material. The sterilization material may include at least one of the following: hydrogen peroxide, peracid, ozone, or a combination thereof. The sterilization material may include at least 10 weight percent of the sterilization particle. The porous carrier material may include at least one of the following: silica-based material, silica-alumina, alumina, or a combination thereof. The silica-based material may include a silica gel. The porous carrier material may include an organic-based material. The organic-based material may include acrylate. A partial pressure of the gaseous sterilization material in the gas may be at least 0.1 mmHg.

In some non-limiting embodiments or aspects, the porous carrier material may be exposed to the gaseous sterilization material in a closed container. The closed container may include a desiccant. The porous carrier material in a fluidized state may be exposed to the gaseous sterilization material in a closed container under a continuous recirculating flow of the gaseous sterilization material. The porous carrier material in a fluidized state may be exposed to the gaseous sterilization material in a closed container under a continuous recirculating flow of the gaseous sterilization material, where a flow rate of the continuous recirculating flow may be at least 0.1 m³/h for up to 5 days. The porous carrier material in a fluidized state may be exposed to the gaseous sterilization material in an open container under a continuous non-recirculating flow of the gaseous sterilization material, where a flow rate of the continuous non-recirculating flow may be at least 0.1 m³/h for up to 5 days. The porous carrier material in a non-fluidized state may be exposed to (or percolated by) the gaseous sterilization material in an open container under a continuous non-recirculating flow of the gaseous sterilization material, where a flow rate of the continuous non-recirculating flow may be at least 0.1 m³/h for up to 5 days. The gaseous sterilization material may be dried with a desiccant prior to exposure to the porous carrier material. The porous carrier material may be exposed to the gaseous sterilization material in a container containing a desiccant.

According to some non-limiting embodiments or aspects, a method of sterilizing a space, includes: introducing into a space a sterilization particle including: a porous carrier material including at least one of the following: a microporous material, a mesoporous material, a macroporous material, or a combination thereof; and a sterilization material contained in pores of the porous carrier material or adsorbed on a surface of the porous carrier material. The sterilization material includes at least 4 weight percent of the sterilization particle. The method includes releasing the sterilization material from the pores.

In some non-limiting embodiments or aspects, the sterilization material may be heated to a temperature below 120° C. to release the sterilization material from the pores. The sterilization material may be contained in the pores so as to be released from the pores and into surroundings of the sterilization particle by fluidization of the particles. A pressure surrounding the sterilization particle may be from complete vacuum to normal atmospheric pressure. The sterilization material may be released into the space for a time period of up to two weeks. The sterilization material may be released into the space for a time period of up to 2 hours. The space may include at least one medical device. The space may include a healthcare room. The space may include a device to be biodecontaminated. The space may include a biopharmaceutical to be sterilized. The space may include an electronic component being fabricated. The space may include an industrial facility. The sterilization particle may be contained in a sterilization device. The sterilization material may include at least one of the following: hydrogen peroxide, peracid, ozone, or a combination thereof. The sterilization material may include at least 10 weight percent of the sterilization particle. The porous carrier material may include at least one of the following: silica-based material, silica-alumina, alumina, or a combination thereof. The silica-based material may include a silica gel. The porous carrier material may include an organic-based material. The organic-based material may include acrylate.

Further embodiments or aspects are set forth in the following numbered clauses:

Clause 1: A sterilization particle, comprising: a porous carrier material comprising at least one of the following: a microporous material, a mesoporous material, a macroporous material, or a combination thereof; and a sterilization material contained in pores of the porous carrier material or adsorbed on a surface of the porous carrier material, wherein the sterilization material comprises at least 4 weight percent of the sterilization particle.

Clause 2: The sterilization particle of clause 1, wherein the sterilization material comprises at least one of the following: hydrogen peroxide, peracid, ozone, or a combination thereof.

Clause 3: The sterilization particle of clause 1 or 2, wherein the sterilization material comprises at least 10 weight percent of the sterilization particle.

Clause 4: The sterilization particle of any of clauses 1-3, wherein the porous carrier material comprises at least one of the following: silica-based material, silica-alumina, alumina, or a combination thereof.

Clause 5: The sterilization particle of clause 4, wherein the silica-based material comprises a silica gel.

Clause 6: The sterilization particle of any of clauses 1-5, wherein the porous carrier material comprises an organic-based material.

Clause 7: The sterilization particle of clause 6, wherein the organic-based material comprises acrylate.

Clause 8: The sterilization particle of any of clauses 1-7, further comprising a stabilizer.

Clause 9: The sterilization particle of clause 8, wherein the stabilizer comprises at least one of: ethylenediaminetetraacetic acid (EDTA), diethylenetriaminepentaacetate (DTPA), citric acid, phosphate, tin, oxalic acid, tartaric acid, or a combination thereof.

Clause 10: The sterilization particle of any of clauses 1-9, wherein the porous carrier material comprises a recycled porous carrier material.

Clause 11: The sterilization particle of any of clauses 1-10, wherein the sterilization material is loaded into the pores as a gas.

Clause 12: The sterilization particle of clause 11, wherein a partial pressure of the sterilization material in the gas is at least 0.1 mmHg.

Clause 13: The sterilization particle of any of clauses 1-12, wherein the sterilization material is contained in the pores so as to be released from the pores and into surroundings of the sterilization particle at a temperature below 120° C.

Clause 14: The sterilization particle of any of clauses 1-13, wherein the sterilization material is contained in the pores so as to be released from the pores and into surroundings of the sterilization particle at an absolute pressure lower than normal atmospheric pressure.

Clause 15: The sterilization particle of any of clauses 1-14, wherein the sterilization material is contained in the pores so as to be released from the pores and into surroundings of the sterilization particle at normal atmospheric pressure.

Clause 16: The sterilization particle of any of clauses 1-15, wherein the sterilization material is contained in the pores so as to be released from the pores and into surroundings of the sterilization particle without contacting the sterilization particle with water.

Clause 17: A sterilization device containing the sterilization particle of any of clauses 1-16.

Clause 18: A method of preparing a sterilization particle, comprising: providing a porous carrier material comprising at least one of the following: a microporous material, a mesoporous material, a macroporous material, or a combination thereof; and exposing the porous carrier material to a gas comprising a gaseous sterilization material to form a sterilization particle, wherein the porous carrier material is exposed to the gaseous sterilization material under conditions sufficient to introduce the gaseous sterilization material into pores of the porous carrier material or to adsorb the gaseous sterilization material on a surface of the porous carrier material, such that the sterilization material comprises at least 4 weight percent of the sterilization particle.

Clause 19: The method of clause 18, wherein the porous carrier material is exposed to the gaseous sterilization material at a temperature of up to 200° C. for from 6 hours to 10 days.

Clause 20: The method of clause 18 or 19, wherein before exposing the porous carrier material to the gaseous sterilization material, the porous carrier material is heated to a temperature of up to 500° C. for up to 1 minute.

Clause 21: The method of any of clauses 18-20, wherein before exposing the porous carrier material to the gaseous sterilization material, the porous carrier material is heated to a temperature of up to 300° C. for at least 1 minute.

Clause 22: The method of any of clauses 18-21, further comprising drying the porous carrier material before exposing the porous carrier material to the gaseous sterilization material.

Clause 23: The method of any of clauses 18-22, wherein the porous carrier material is mixed with a stabilizer with incipient humidity before heating or drying the porous carrier material.

Clause 24: The method of any of clauses 18-23, wherein the sterilization material comprises at least one of the following: hydrogen peroxide, peracid, ozone, or a combination thereof.

Clause 25: The method of any of clauses 18-24, wherein the sterilization material comprises at least 10 weight percent of the sterilization particle.

Clause 26: The method of any of clauses 18-25, wherein the porous carrier material comprises at least one of the following: silica-based material, silica-alumina, alumina, or a combination thereof.

Clause 27: The method of clause 26, wherein the silica-based material comprises a silica gel.

Clause 28: The method of any of clauses 18-27, wherein the porous carrier material comprises an organic-based material.

Clause 29: The method of clause 28, wherein the organic-based material comprises acrylate.

Clause 30: The method of any of clauses 18-29, wherein a partial pressure of the gaseous sterilization material in the gas is at least 0.1 mmHg.

Clause 31: The method of any of clauses 18-30, wherein the porous carrier material is exposed to the gaseous sterilization material in a closed container.

Clause 32: The method of clause 31, wherein the closed container comprises a desiccant.

Clause 33: The method of any of clauses 18-32, wherein the porous carrier material in a fluidized state is exposed to the gaseous sterilization material in a closed container under a continuous recirculating flow of the gaseous sterilization material.

Clause 34: The method of clause 33, wherein the porous carrier material in a fluidized state is exposed to the gaseous sterilization material in a closed container under a continuous recirculating flow of the gaseous sterilization material, wherein a flow rate of the continuous recirculating flow is at least 0.1 m$^3$/h for up to 5 days.

Clause 35: The method of any of clauses 18-34, wherein the porous carrier material in a fluidized state is exposed to the gaseous sterilization material in an open container under a continuous non-recirculating flow of the gaseous sterilization material, wherein a flow rate of the continuous non-recirculating flow is at least 0.1 m$^3$/h for up to 5 days.

Clause 36: The method of any of clauses 18-35, wherein the gaseous sterilization material is dried with a desiccant prior to exposure to the porous carrier material.

Clause 37: The method of any of clauses 18-36, wherein the porous carrier material is exposed to the gaseous sterilization material in a container containing a desiccant.

Clause 38: A method of sterilizing a space, comprising: introducing into a space a sterilization particle comprising: a porous carrier material comprising at least one of the following: a microporous material, a mesoporous material, a macroporous material, or a combination thereof; and a sterilization material contained in pores of the porous carrier material or adsorbed on a surface of the porous carrier material, wherein the sterilization material comprises at least 4 weight percent of the sterilization particle; and releasing the sterilization material from the pores.

Clause 39: The method of clause 38, wherein the sterilization material is heated to a temperature below 120° C.

Clause 40: The method of clause 38 or 39, wherein a pressure surrounding the sterilization particle is from complete vacuum to normal atmospheric pressure.

Clause 41: The method of any of clauses 38-40, wherein the sterilization material is released into the space for a time period of up to two weeks.

Clause 42: The method of any of clauses 38-41, wherein the sterilization material is released into the space for a time period of up to 2 hours.

Clause 43: The method of any of clauses 38-42, wherein the space comprises at least one medical device or biopharmaceutical to be sterilized.

Clause 44: The method of any of clauses 38-43, wherein the space comprises a healthcare room.

Clause 45: The method of any of clauses 38-44, wherein the space comprises a device to be biodecontaminated.

Clause 46: The method of any of clauses 38-45, wherein the space comprises an electronic component being fabricated.

Clause 47: The method of any of clauses 38-46, wherein the space comprises an industrial facility.

Clause 48: The method of any of clauses 38-47, wherein the sterilization particle is contained in a sterilization device.

Clause 49: The method of any of clauses 38-48, wherein the sterilization material comprises at least one of the following: hydrogen peroxide, peracid, ozone, or a combination thereof.

Clause 50: The method of any of clauses 38-49, wherein the sterilization material comprises at least 10 weight percent of the sterilization particle.

Clause 51: The method of any of clauses 38-50, wherein the porous carrier material comprises at least one of the following: silica-based material, silica-alumina, alumina, or a combination thereof.

Clause 52: The method of clause 51, wherein the silica-based material comprises a silica gel.

Clause 53: The method of any of clauses 38-52, wherein the porous carrier material comprises an organic-based material.

Clause 54: The method of clause 53, wherein the organic-based material comprises acrylate.

Clause 55: The method of any of clauses 18-37, wherein the porous carrier material in a non-fluidized state is percolated to the gaseous sterilization material in an open container under a continuous non-recirculating flow of the gaseous sterilization material, wherein a flow rate of the continuous non-recirculating flow is at least 0.1 m$^3$/h for up to 10 days.

Clause 56: The method of any of clauses 18-37 and 55, wherein the sterilization particle is heated to at least 37° C. for no less than 1 min, so the ratio of hydrogen peroxide to water is increased.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the non-limiting exemplary embodiments that are illustrated in the accompanying schematic figures, in which.

DETAILED DESCRIPTION

Figure 1:
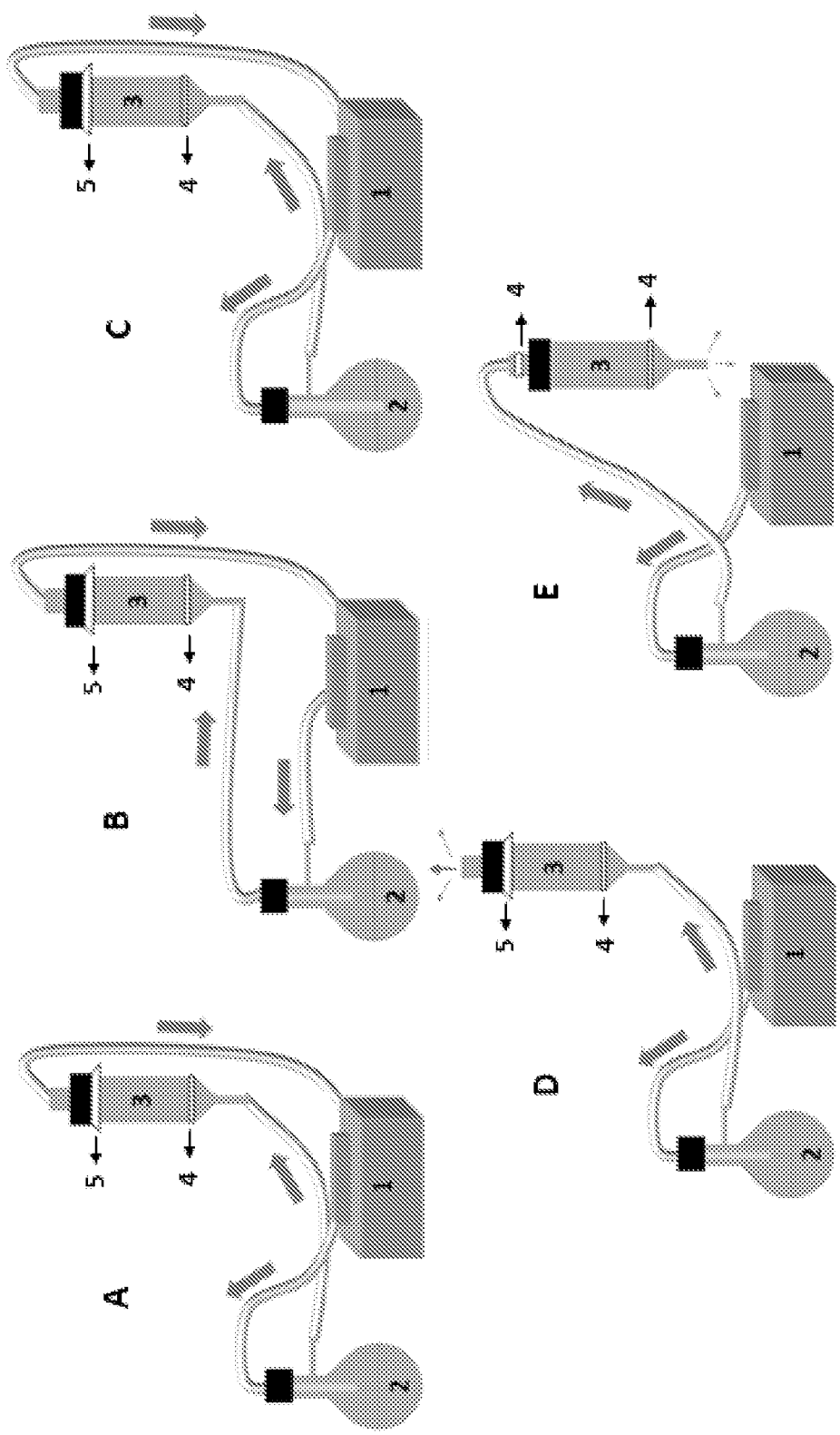
FIG. 1 shows an experimental arrangement for loading hydrogen peroxide under a continuous flow according to Modes A-E; 1—Vacuum Pump; 2—Flask Containing Hydrogen Peroxide; 3—Upper Chamber Containing Sterilization Particle; 4—Porous glass membrane; 5—Filter.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, "microporous material" refers to a material having pores with a width of less than 2 nanometers.

As used herein, "mesoporous material" refers to a material having pores with a width from 2 to 50 nanometers.

As used herein, "macroporous material" refers to a material having pores with a width greater than 50 nanometers.

As used herein, "nanopores" refer to pores with a width less than 100 nanometers.

As used herein, adsorption/absorption into or released from the pores refers to the adsorption/absorption into or release from the pores as well as the inner walls of the pores and the outer surface of the porous carrier material.

As used herein, "loading" refers to the process by which sterilization material, such as hydrogen peroxide, is incorporated in a chemical compound or a porous material.

The present disclosure is directed to a sterilization particle comprising: a porous carrier material comprising at least one of the following: a microporous material, a mesoporous material, a macroporous material, or a combination thereof; and a sterilization material contained in pores of the porous carrier material or adsorbed on a surface of the porous carrier material, wherein the sterilization material comprises at least 4 weight percent of the sterilization particle. The sterilization particle may include a stabilizer.

The porous carrier material may include an organic or inorganic material. Non-limiting examples of inorganic porous carrier materials include silica-based materials, silica-alumina, alumina, or some combination thereof. The silica-based material may include a silica gel. The porous carrier material may be a non-functionalized material. Non-limiting examples of organic porous carrier materials include acrylate. The porous carrier material may be a microporous material, a mesoporous material, a macroporous material, or some combination thereof.

Non-limiting examples of the sterilization material include hydrogen peroxide, peracid, ozone, or some combination thereof. The sterilization material may be a gaseous material when loading the porous carrier material therewith. The sterilization material may be in an adsorbate state as loaded in the porous carrier material and may be in a gaseous state when released from the porous carrier material.

The sterilization particle may include a stabilizer. Non-limiting examples of the stabilizer material include EDTA, DTPA, citric acid, phosphate, tin, oxalic acid, tartaric acid, or some combination thereof. The porous carrier material may be mixed with the stabilizer with incipient humidity before heating or drying the porous carrier material. As used herein, "incipient humidity" refers to a minimal amount of water needed to mix two powders.

The sterilization particle may include the sterilization material loaded into pores of the porous carrier material or adsorbed on a surface thereof. The sterilization material may be loaded into the pores or adsorbed on the surface of the porous carrier material as gas. The sterilization material may be loaded into the pores or adsorbed on the surface of the porous carrier material in a gas. The partial pressure of the sterilization material in the gas may be at least 0.1 mmHg, such as at least 0.5 mmHg at least 1.0 mmHg, at least 1.5 mmHg, at least 2.0 mmHg, or at least 2.5 mmHg. The partial pressure of the sterilization material in the gas may be up to 3.0 mmHg, such as up to 2.5 mmHg up to 2.0 mmHg, up to 1.5 mmHg, or up to 1.0 mmHg. The partial pressure of the sterilization material in the gas may be from 0.1 mmHg-3.0 mmHg, such as 0.1 mmHg-2.0 mmHg, 0.1 mmHg-1.0 mmHg, 0.5 mmHg-3.0 mmHg, 0.5 mmHg-2.0 mmHg, 0.5 mmHg-1.0 mmHg, 1.0 mmHg-3.0 mmHg, or 1.0 mmHg-2.0 mmHg.

In some non-limiting examples, the sterilization material may be loaded into the pores or adsorbed on the surface of the porous carrier material without contacting the porous carrier material with a liquid solution of the sterilization material. The sterilization material may be loaded into the pores or adsorbed on the surface of the porous carrier material after the porous carrier material has been prepared, rather than the porous carrier material being prepared in situ with the sterilization material so that loading occurs simultaneously.

The resulting sterilization particle may be such that the sterilization material comprises at least 4 weight percent of the sterilization particle, such as at least 5 weight percent, at least 6 weight percent, at least 8 weight percent, at least 10 weight percent, at least 12 weight percent, at least 15 weight percent, at least 20 weight percent, at least 25 weight percent, at least 30 weight percent, or at least 35 weight percent. The resulting sterilization particle may be such that the sterilization material comprises up to 40 weight percent of the sterilization particle, such as up to 35 weight percent, up to 30 weight percent, up to 20 weight percent, up to 16 weight percent, up to 15 weight percent, or up to 12 weight percent. The resulting sterilization particle may be such that the sterilization material comprises 4-40 weight percent of the sterilization particle, such as 4-30 weight percent, such as 4-25 weight percent, such as 4-20 weight percent, 4-16 weight percent, 4-15 weight percent, 4-10 weight percent, 6-25 weight percent, 6-20 weight percent, 6-16 weight percent, 6-15 weight percent, 10-25 weight percent, 10-20 weight percent, 10-16 weight percent, 10-15 weight percent, 15-25 weight percent, or 15-20 weight percent.

The sterilization particle may be prepared by a process comprising: providing a porous carrier material comprising at least one of the following: a microporous material, a mesoporous material, a macroporous material, or a combination thereof; optionally a stabilizer; and exposing the porous carrier material to a gas comprising a gaseous sterilization material to form the sterilization particle. The porous carrier material may be exposed to the gaseous sterilization material under conditions sufficient to introduce the gaseous sterilization material into pores of the porous carrier material or to adsorb the gaseous sterilization material on a surface of the porous carrier material, such that the sterilization material comprises at least 4 weight percent of the sterilization particle.

Before exposing the porous carrier material to the gaseous sterilization material, the porous carrier material may be heated to a temperature of up to 500° C., such as up to 300° C. for at least 1 minute. Previously used porous carried material can be recycled by these heat-exposing steps to form a recycled porous carrier material.

The porous carrier material may be dried before exposing the porous carrier material to the gaseous sterilization material. The porous carrier material may be dried by heating the porous carrier material to a temperature of at least 100° C., such as at least 200° C., for at least 12 hours, such as at least 24 hours.

Previous heating and drying steps may be used to recycle the porous carrier material.

The porous carrier material may be exposed to the gaseous sterilization material in an open or closed container. The container may contain a desiccant. The porous carrier material may be exposed to the gaseous sterilization material in the container containing the desiccant. The porous carrier material may be exposed to the gaseous sterilization material while the porous carrier material is in a fluidized state in the container. In some non-limiting examples, the porous carrier material in a fluidized state may be exposed to the gaseous sterilization material in the container (opened or closed) under a continuous non-recirculating (or recirculating, respectively) flow of the gaseous sterilization material. The porous carrier material in a non-fluidized state may be percolated with the gaseous sterilization material in the opened container under a continuous non-recirculating flow of the gaseous sterilization material. The flow rate of the continuous flow may be at least 0.1 m³/h, such as at least 0.5 m³/h, at least 0.75 m³/h, 1.0 m³/h, or 1.2 m³/h. The continuous recirculating flow may occur for up to 10 days, such as up to 2 days, up to 1 day, up to 12 hours, up to 6 hours, up to 3 hours, or up to 1 hour.

Once prepared, the sterilization particle may be contained in a sterilization device, and the sterilization device may be used to sterilize a space. The sterilization particle may be contained in any suitable sterilization device. The sterilization device may be configured to release gaseous sterilization material into the space to sterilize the space. The sterilization device may include the sterilization device as described in U.S. Provisional Application No. 62/949,612 (the disclosure of which is incorporated herein by reference), and the sterilization material may be released by operating the sterilization device as described therein.

The space may be sterilized by: introducing the sterilization particle into a space and releasing the sterilization material from the pores.

The sterilization material (thus the sterilization particle) may be heated to a temperature below 120° C., such as below 100° C., below 90° C., below 70° C., or below 60° C., to release the sterilization material from the pores. The sterilization material may be heated to a temperature below a boiling point of a solution contained in the pores containing the sterilization material (e.g., a hydrogen peroxide/water solution) to release the sterilization material from the pores.

The sterilization material may be released from the pores and into the space surrounding of the sterilization particle at an absolute pressure at or below normal atmospheric pressure (760 mmHg). The pressure of the space of the surroundings of the sterilization particle may range from complete vacuum (0 mmHg) to normal atmospheric pressure. The space of the surroundings refers to the space surrounding the release device containing the sterilization particle, which is to be sterilized. The space may include at least one object, such as equipment to be sterilized.

In some non-limiting examples, the sterilization material may be released into the space over a time period of up to 2 weeks, such as up to 1 week, up to 5 days, up to 2 days, up to 24 hours, up to 20 hours, up to 16 hours, up to 12 hours, up to 10 hours, up to 8 hours, or up to 6 hours. The sterilization material may be released into the space over a time period ranging from 6 hours-2 weeks, such as 6-24 hours, 10-24 hours, 12-24 hours, 20-24 hours, 24 hours to 1 month, 6 hours to 2 weeks, 6 hours to 5 days, or 6 hours to 2 days. In some non-limiting examples, the sterilization material may be released into the space over a time period of up to 2 hours, such as up to 1 hour, up to 30 minutes, or up to 15 minutes.

The sterilization material contained in the pores may be released into the surroundings without the sterilization particle being contacted with liquid water.

The space being sterilized using the sterilization particle may include a medical device. The space being sterilized using the sterilization particle may include a device to be bio-decontaminated, such as medical devices, cell phones, tablet computers, or laptop computers. The space being sterilized using the sterilization particle may include an electronic component being fabricated. The space being sterilized using the sterilization particle may be a healthcare room and/or laboratory. The space being sterilized using the sterilization particle may be an industrial facility. The space being sterilized using the sterilization particle may include a biopharmaceutical to be sterilized.

The sterilization material may be subjected to a heating process in order to enrich its relative content in hydrogen peroxide, by increasing the ratio of hydrogen peroxide to water. This sterilization material may be used to carry out biodecontamination under high humidity conditions. For example, the sterilization particle may be heated to at least 37° C. (such as at least 50° C. or at least 60° C.) for no less than 1 min, so the ratio of hydrogen peroxide to water is increased

EXAMPLES

The following examples are presented to demonstrate the general principles of the sterilization particle and methods disclosed herein. The disclosure should not be considered as limited to the specific examples presented.

Measurement of hydrogen peroxide (or other sterilization material) in materials is done using an ultraviolet (UV) methodology. Briefly, a solution containing the material is filtered through a syringe filter and the absorbance of the filtered solution is measured at 240 nm (which is in the UV electromagnetic spectrum).

Electrochemical detection of hydrogen peroxide and water in gas phase is carried out with an electrochemical probe (from Vaisala (Vantaa, Finland)).

The material used in these examples is as follows: Silica gel 60, a silica gel from Acros Organics (Geel, Belgium), hydrogen peroxide 35 or 60 weight percent (wt %) from Thermo Fisher Scientific (Waltham, Mass.), Zeolite 3A from BDH Chemicals (Radnor, Pa.), DTPA from Sigma-Aldrich (St. Louis, US), EDTA from Fisher Bioreagents (Geel, Belgium), Citric Acid anhydrous from Alfa Aesar (Kandel, Germany), chemical indicators C-V-P and C-V-P-2 to detect hydrogen peroxide vapor from gke GmbH (Waldems, Germany) or from NAMSA (Northwood, USA); biological indicators Spordex (from Mesa Labs (Lakewood, USA)) consisting of a stainless steel disc containing one million spores of *Bacillus atrophaeus* wrapped in Tyvek® material; a biological indicator (from gke GmbH (Waldems, Germany)) consisting of a glass fiber disc containing one million spores of G. *Stearothermophilus*.

FIG. 1 shows an experimental arrangement for loading hydrogen peroxide under a continuous flow. A hydrogen peroxide solution (35 wt % or 60 wt %) was placed in the round volumetric flask 2 (also referred to as bottom chamber 2) kept at room temperature, and a vacuum pump 1 circulated an atmosphere containing hydrogen peroxide vapor into the top chamber 3 where material was placed to absorb/adsorb hydrogen peroxide. A porous glass membrane 4 and/or a microfilter 5 were placed, respectively in the bottom and on the top of this chamber 3. Mode A involved the entry of vapor through a suspended tube at the top of the volumetric flask, causing turbulence in the hydrogen peroxide solution. In Mode B, the vapor came through a tube on the side of the volumetric flask, causing no turbulence in the solution. Mode C was similar to Mode A, but the tube was immersed in the solution, causing bubbling. Mode D was as mode A, but the circuit was open, and vapor did not recirculate. Mode E was as mode D, but the vapor flow crossed the container where the porous carrier material was placed from top to bottom.

Figure 5:
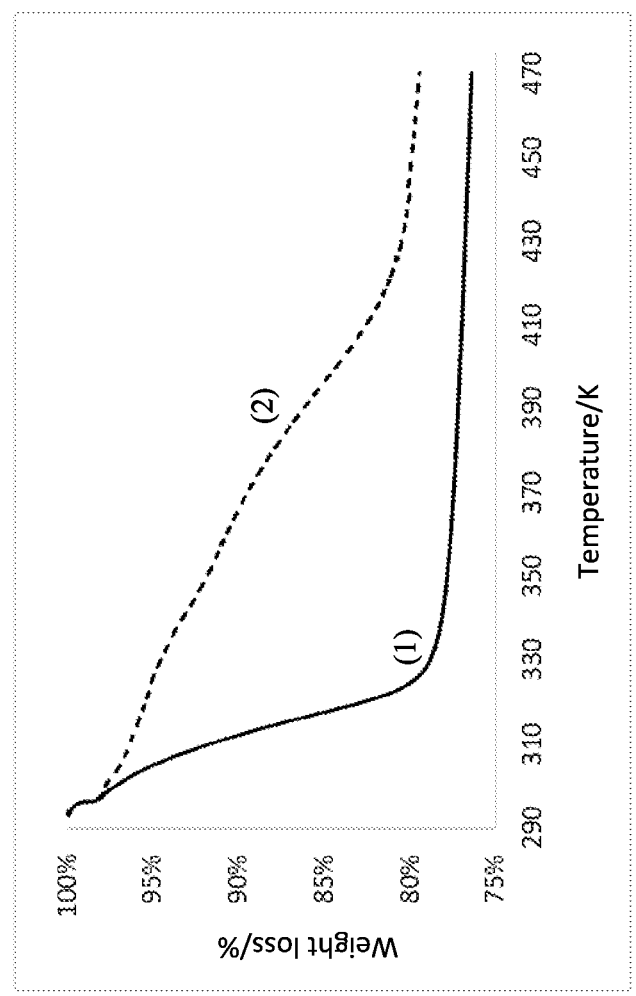
FIG. 5 shows a graph of percentage of weight loss of SBA-15 (1—solid line) and Zeolite 4A (2—dashed line) loaded with hydrogen peroxide as a function of temperature for Examples 1 and 2.
Figure 7:
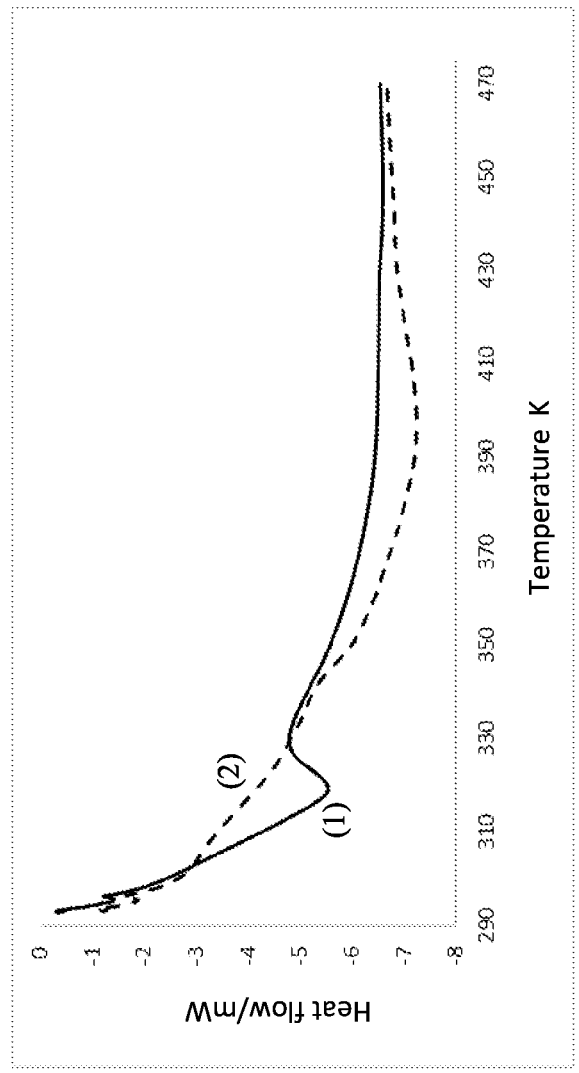
FIG. 7 shows a graph of heat flow of SBA-15 (1—solid line) and Zeolite 4A (2—dashed line) loaded with hydrogen peroxide as a function of temperature for Examples 1 and 2.

Example 1: 10 mg of SBA-15 (from Glantreo Ltd, Ireland, particle size of 100 micron, hexagonal pore morphology) particles were dried at 200° C. for three days. This material was then put in a closed glass container containing an atmosphere of hydrogen peroxide vapor produced by a 35 wt % solution of hydrogen peroxide placed inside the container. The profile of release of weight loss as a function of temperature was obtained as shown in FIG. 5 line (1). Heat flow is shown in FIG. 7 line (1).

Example 2: 10 mg of Zeolite 4A particles were dried at 200° C. for three days. This material was then put in a closed glass container containing an atmosphere of hydrogen peroxide vapor produced by a 35 wt % solution of hydrogen peroxide placed inside the container. The profile of release of weight loss as a function of temperature was obtained as shown in FIG. 5 line (2). Heat flow is shown in FIG. 7 line (2). The release profiles of Examples 1 and 2 for SBA-15 and zeolite 4A against temperature are different, namely SBA-15 releases higher amounts of the gaseous sterilization material at lower temperatures.

Example 3: 5 g of SBA-15 were dried at 200° C. for three days. Then, the SBA-15 and 300 g of Zeolite 3A were introduced in the 250 L closed container (in separated reservoirs) where an atmosphere of hydrogen peroxide (220 ppm; relative saturation in the range of 40-60%) was present at room temperature. After three days, SBA-15 adsorbed/absorbed 15.5 wt % of hydrogen peroxide, as measured by the UV method.

Figure 6:
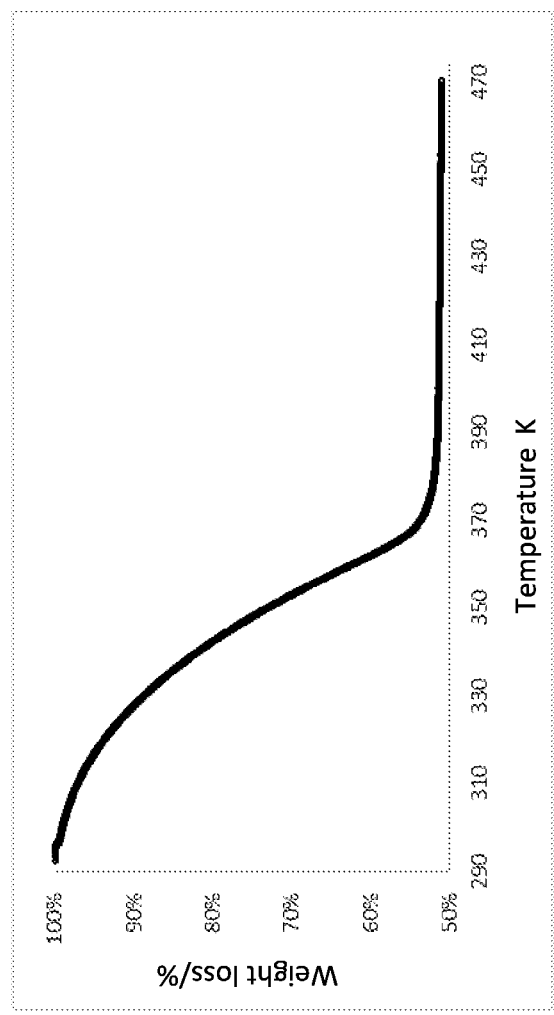
FIG. 6 shows a graph of percentage of weight loss of silica-gel loaded with hydrogen peroxide as a function of temperature for Example 4.
Figure 8:
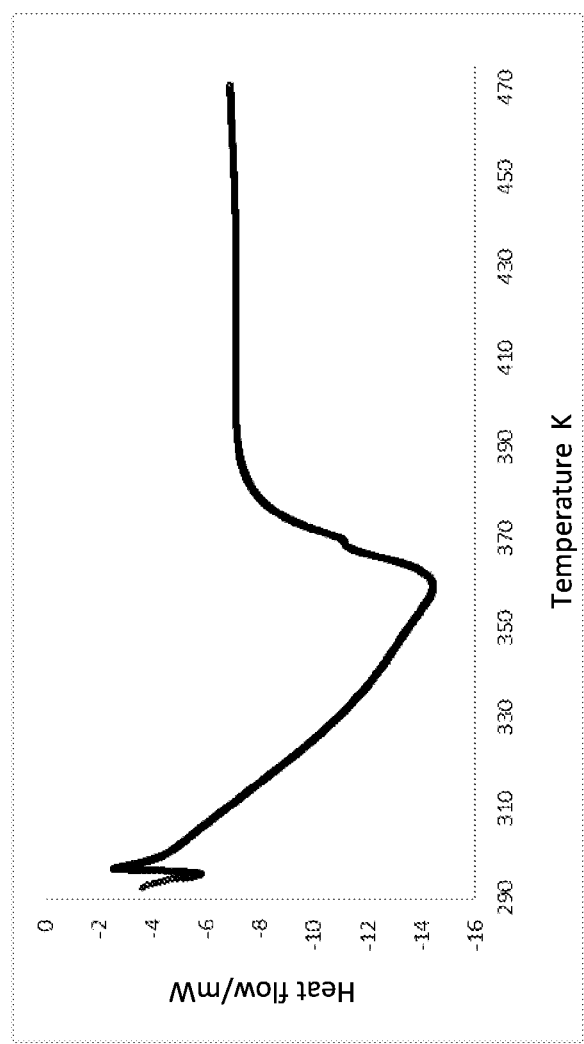
FIG. 8 shows a graph of heat flow of silica-gel loaded with hydrogen peroxide as a function of temperature for Example 4.

Example 4: 20 g of silica gel were dried at 200° C. for three days. Then, the silica gel was put in a 250 L closed container where an atmosphere of hydrogen peroxide (220 ppm; relative saturation in the range of 40-60%) was present at room temperature. After three days silica gel particles adsorbed/absorbed 12 wt % of hydrogen peroxide, as measured by the UV method. The profile of release of weight loss as a function of temperature was obtained as shown in FIG. 6. Heat flow is shown in FIG. 8.

Example 5: 50 g of silica gel were dried at 200° C. for three days. Then, the silica gel and 300 g of Zeolite 3A were introduced in the 250 L closed container (in separated reservoirs) where an atmosphere of hydrogen peroxide (220 ppm; relative saturation in the range of 40-60%) was present at room temperature (20-27° C.). After three days, silica gel particles adsorbed/absorbed 16 wt % of hydrogen peroxide, as measured by the UV method.

Figure 2:
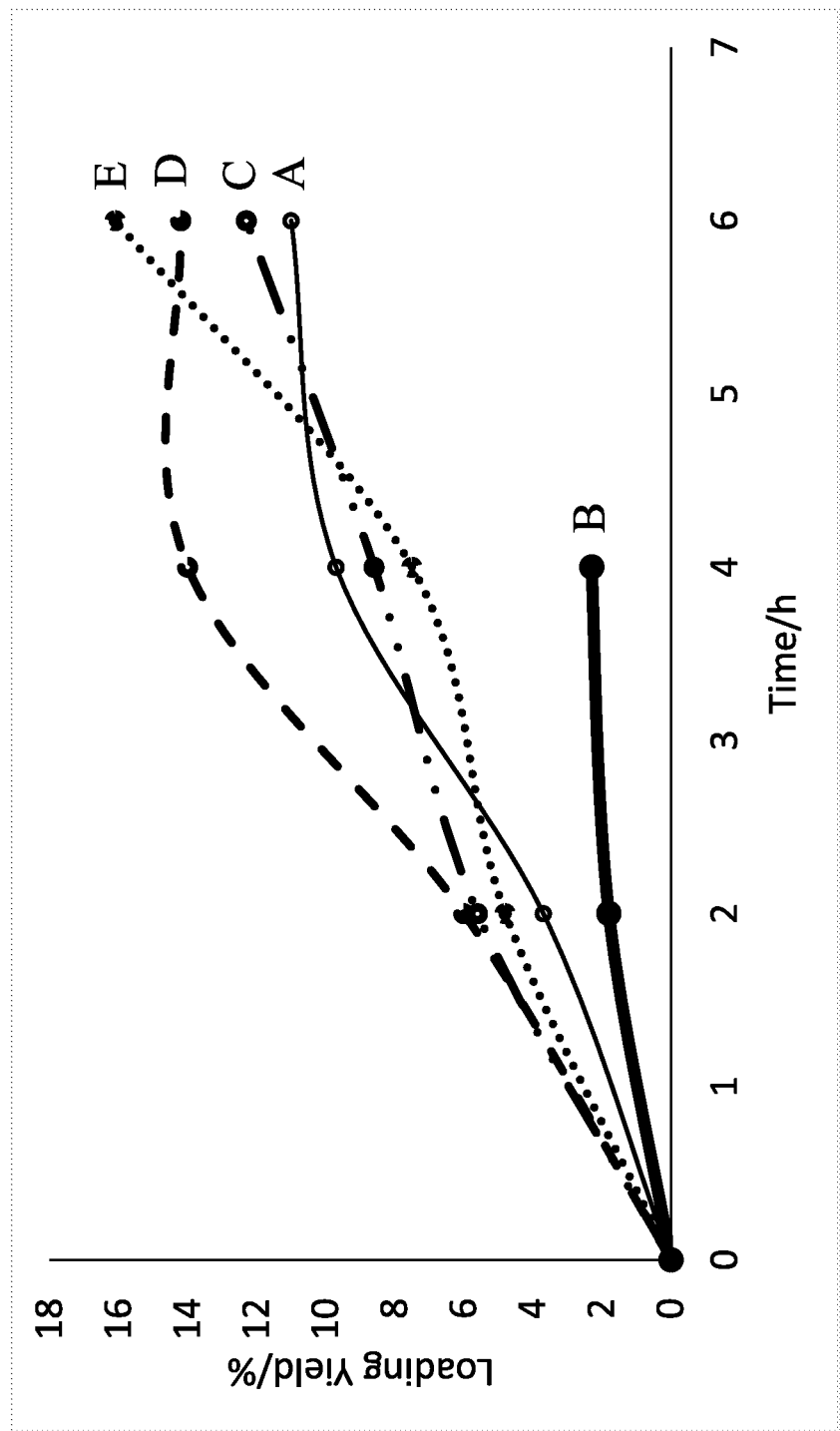
FIG. 2 shows a graph of loading yield as a function of time for Modes A-E of Example 6; A—Mode A; B—Mode B; C—Mode C; D—Mode D; E—Mode E.

Example 6: 5 g of silica gel were dried at 200° C. for three days. Then, the 5 g of the silica gel was introduced in the top chamber 3 of each of the five set-ups shown in FIG. 1, with the bottom chamber 2 containing hydrogen peroxide solution (35 wt %) at room temperature. Time courses of adsorbed/absorbed hydrogen peroxide, as measured by the UV method are shown in FIG. 2.

Example 7: 5 g of silica gel were dried at 200° C. for three days. Then, the 5 g of silica gel were introduced in the top chamber 3 of the set-up shown in FIG. 1, Mode A, with the bottom chamber 2 containing hydrogen peroxide solution (35 wt %) at room temperature. After six hours, the silica gel adsorbed/absorbed 12 wt % of hydrogen peroxide as measured by the UV method.

Example 8: 5 g of silica gel were dried at 200° C. for three days. Then, the 5 g of the silica gel were introduced in the top chamber 3 of the arrangement shown in FIG. 1, Mode A, with the bottom chamber 2 containing hydrogen peroxide solution (60 wt %) at room temperature. After six hours, the silica gel adsorbed/absorbed 12 wt % of hydrogen peroxide, as measured by the UV method.

Example 9: 5 g of desiccant, Zeolite 3A, were dried at 200° C. for three days. Then, the 5 g of the Zeolite 3A were introduced in the top chamber 3 of the set-up shown in FIG. 1, Mode A, with the bottom chamber 2 containing hydrogen peroxide solution (35 wt %). After six hours, Zeolite 3A adsorbed/absorbed 1 wt % of hydrogen peroxide, as measured by the UV method.

Example 10: 50 g of silica gel were dried at 200° C. for three days. Stabilizers were added, according to Table 1. Then, the 50 g of this material were introduced in the top chamber 3 of the arrangement shown in FIG. 1, Mode D, with the bottom chamber 2 containing hydrogen peroxide solution (35 wt %) at room temperature. After 5 days, the silica gel adsorbed/absorbed 26.5 wt % of hydrogen peroxide, as measured by the UV method. Remaining amount of hydrogen peroxide after two months is shown in Table 1. Table 1 compares the initial content of hydrogen peroxide against the content after 2 months and/or 3 months, by silica-gel combined with different stabilizers in different concentrations for Example 10.

TABLE 1

| Sterilization Particle | Initial $H_2O_2$ Content (w/w) | 2 Months $H_2O_2$ Content (w/w) | 3 Months $H_2O_2$ Content (w/w) |
| --- | --- | --- | --- |
| Silica | 23.7% | 0% | 0% |
| Silica + EDTA 2% | 20.1% | 10.0% | 4.3% |
| Silica + Citrate 2% | 24.7% | 14.4% | 7.1% |
| Silica + Citrate 1% | 26.9% | 14.1% | 12.6% |
| Silica + DTPA 2% | 16.0% | — | 5.6% |

Example 11: 10 g of silica gel were dried at 200° C. for three days. Then, the 10 g of the silica gel were introduced in the top chamber of the arrangement shown in FIG. 1, Mode E, with the bottom chamber containing hydrogen peroxide solution (35 wt %) at room temperature. After 48 hours, the silica gel adsorbed/absorbed 26 wt % of hydrogen peroxide, as measured by the UV method.

Example 12: 50 g of silica gel were dried at 200° C. for three days. Then, the 50 g of the silica gel were introduced in the top chamber 3 of the arrangement shown in FIG. 1, Mode E, with the bottom chamber 2 containing hydrogen peroxide solution (35 wt %) at room temperature. After 5 days, the silica gel adsorbed/absorbed 23.6 wt % of hydrogen peroxide, as measured by the UV method.

Figure 3:
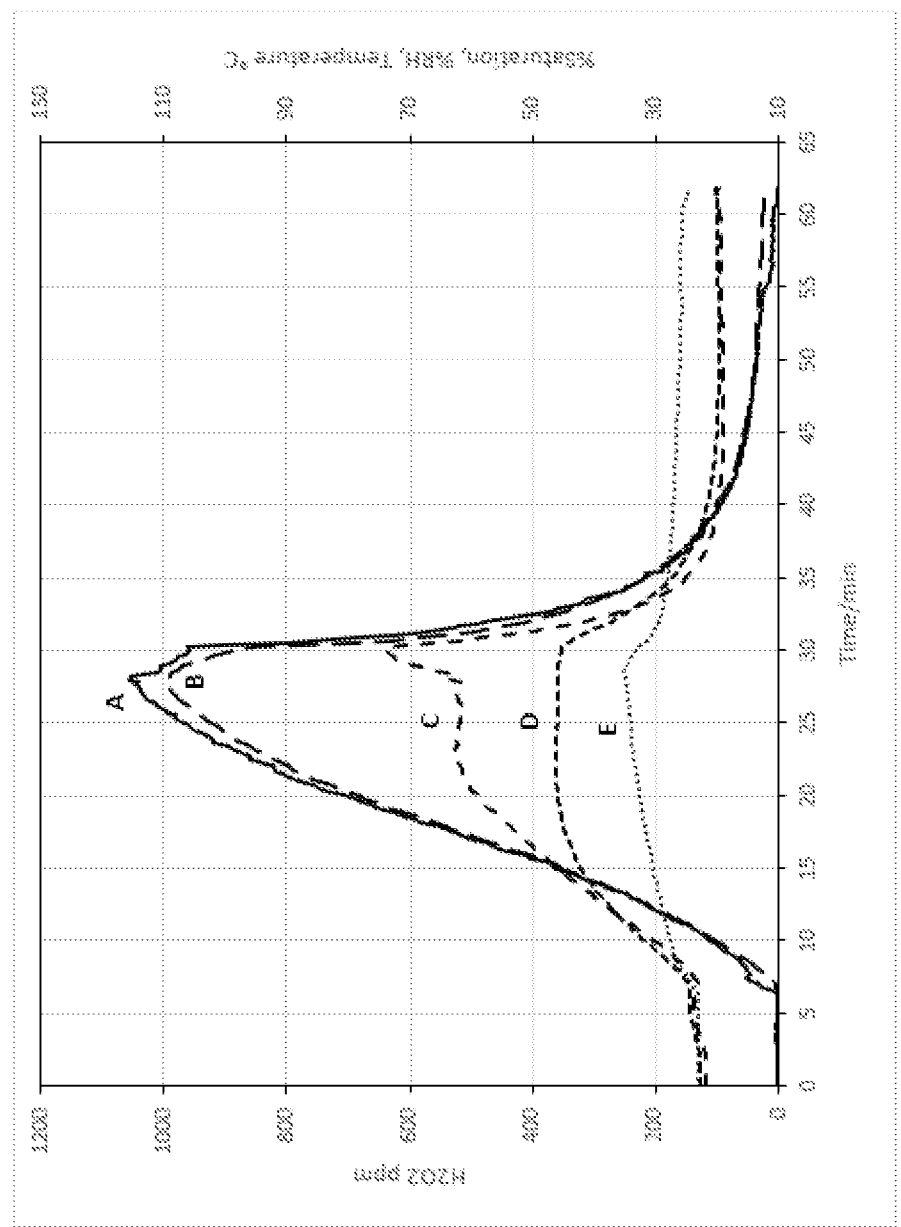
FIG. 3 shows a graph of the build-up of hydrogen peroxide as a function of time and relative saturation as a function of time for Example 13; Line A—Hydrogen peroxide concentration measured by Draeger probe/ppm; Line B—Hydrogen peroxide concentration measured by Vaisala probe/ppm; Line C—Saturation/%; Line D—Relative humidity/%; Line E—Temperature/° C.

Example 13: Inside a 0.7 $m^3$ glove box, 25 g of the sterilization particles obtained by way of Example 10 were put in a hydrogen peroxide vaporizer prototype that fluidized the silica gel, while heating it to 80° C. A rapid build-up of hydrogen peroxide in the atmosphere shown in FIG. 3 was observed, reaching a maximum of 1056 ppm and relative saturation of 74%.

Figure 4:
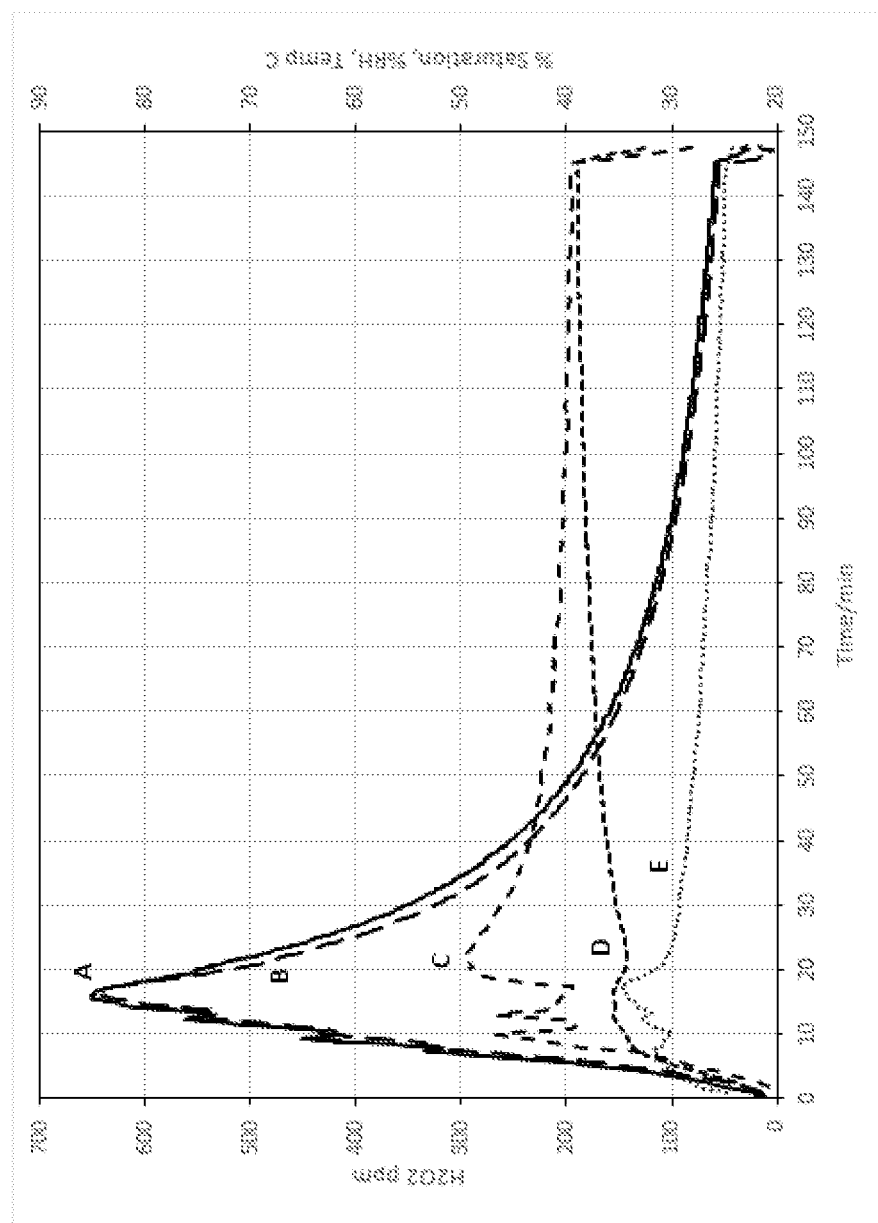
FIG. 4 shows a graph of the build-up of hydrogen peroxide as a function of time and relative saturation as a function of time for Example 14; Line A—Hydrogen peroxide concentration measured by Draeger probe/ppm; Line B—Hydrogen peroxide concentration measured by Vaisala probe/ppm; Line C—Saturation/%; Line D—Relative humidity/%; Line E—Temperature/° C.

Example 14: Inside a 0.7 $m^3$ glove box, 15 g of the sterilization particles obtained by way of Example 10 were put in a hydrogen peroxide vaporizer prototype that fluidized the silica gel, while heating it to 80° C. A rapid build-up of hydrogen peroxide in the atmosphere shown in FIG. 4 was observed, reaching a maximum of 651 ppm and relative saturation of 49%. Chemical indicators from NAMSA (Northwood, USA) were introduced in the chamber. Biological indicators Spordex (from Mesa Labs (Lakewood, USA)) consisting of a stainless steel disc containing one million spores of *Bacillus atrophaeus* wrapped in Tyvek® material were introduced in the chamber, and when subjected to growth media, it indicated absence of microbiological growth, revealing a successful biodecontamination.

Example 15: 30 mg of the sterilization particles obtained from Example 10 were put inside a tube of 15 mL, together with a chemical indicator C-V-P-2 (from gke GmbH (Waldems, Germany)) and a biological indicator (from gke GmbH (Waldems, Germany)). The tube was closed and placed in the dark at room temperature for 24 h. A complete change of color was observed in the chemical indicator after 24 h and the biological indicators, when subjected to growth media, indicated absence of microbiological growth, revealing a successful biodecontamination.

Example 16: 30 mg of the sterilization particles obtained from Example 10 were put inside a tube of 15 mL, together with a chemical indicator C-V-P-2 (from gke GmbH (Waldems, Germany)) and a biological indicator (from gke GmbH (Waldems, Germany)). The tube was closed and placed in the dark at a temperature of 4° C. for 72 h. A complete change of color was observed in the chemical indicator after 72 h and the biological indicator, when subjected to growth media, indicated absence of microbiological growth, revealing a successful biodecontamination.

Example 17: 30 mg of the sterilization particles obtained from Example 10 were put inside a tube of 15 mL, together with a chemical indicator C-V-P-2 (from gke GmbH (Waldems, Germany)) and a biological indicator (from gke GmbH (Waldems, Germany)). The tube was closed and placed in the dark at a temperature of −17° C. for 1 week. A complete change of color was observed in the chemical indicator after 1 week and the biological indicator, when subjected to growth media, indicated absence of microbiological growth, revealing a successful biodecontamination.

Figure 9:
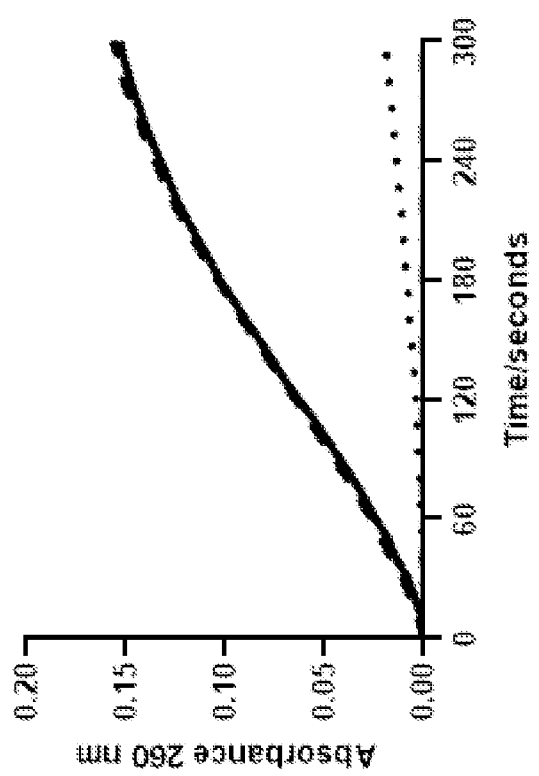
FIG. 9 shows a graph of the DNAse activity, measured by absorbance at 260 nm as a function of time; Dashed line—DNAse Activity; Solid line—DNAse Activity after one week exposure to 100 mg of the sterilization particle at −18° C.; Dotted line—DNAse inactivated; Dashed and dotted line—Without DNAse for Example 18.

Example 18: 100 mg of the sterilization particles obtained from Example 10 were put inside an open microtube and placed on a tube of 50 mL, together with a chemical indicator C-V-P-2 (from gke GmbH (Waldems, Germany)), a biological indicator (from gke GmbH (Waldems, Germany)), and an open vial with DNAse (Sigma-Aldrich (Missouri, USA)). The tube was closed and placed in the dark at a temperature of −18° C. for 1 week. A complete change of color was observed in the chemical indicator after 1 week and the biological indicator, when subjected to growth media, indicated absence of microbiological growth, revealing a successful biodecontamination. After one week of exposure, the DNAse activity was equal to the activity of non-exposed DNAse (control), as shown by FIG. 9.

Figure 10:
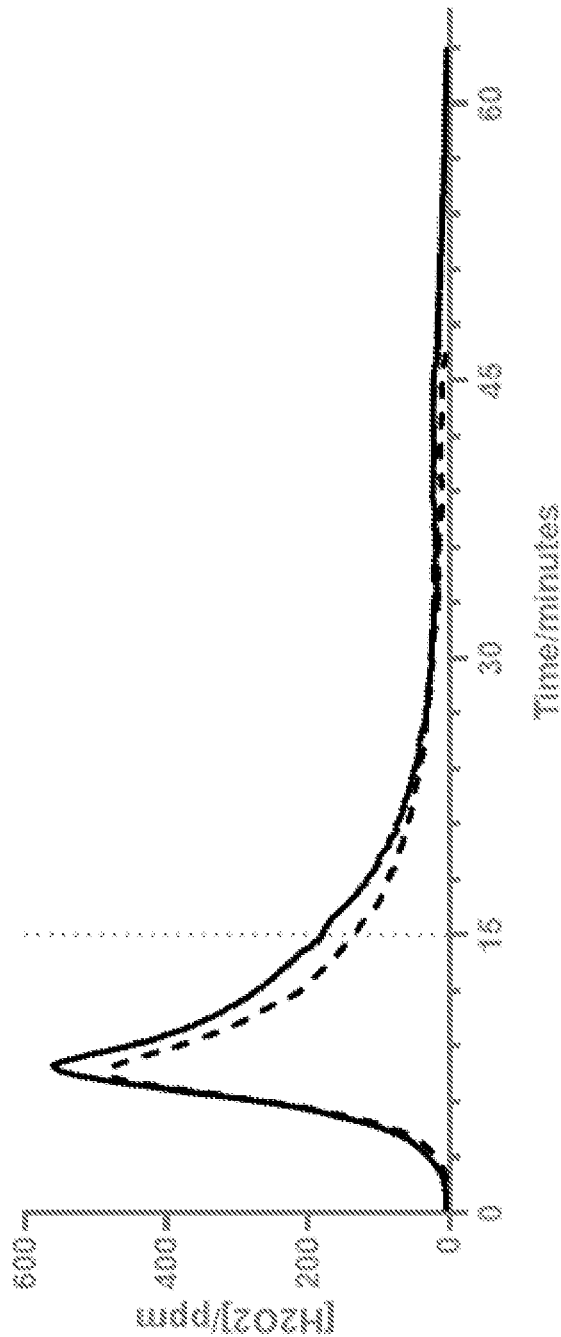
FIG. 10 shows a graph of the build-up of hydrogen peroxide as a function of time, comparing a first-time produced sterilization particle (dashed line) performance against a recycled sterilization particle (solid line) for Example 19.

Example 19: Inside a 0.25 m³ glove box, 5 g of the sterilization particles obtained from Example 10 were put in a hydrogen peroxide vaporizer prototype that fluidized the silica gel, while heating it to 80° C. A rapid build-up of hydrogen peroxide in the atmosphere shown in FIG. 10 (dashed line) was observed, reaching a maximum of 484 ppm. The 5 g of sterilization particles were then recovered and recycled by heating up to 200° C. Inside a 0.25 m³ glove box, 5 g of the sterilization particles reobtained from Example 10 were put in a hydrogen peroxide vaporizer prototype that fluidized the silica gel, while heating it to 80° C. A rapid build-up of hydrogen peroxide in the atmosphere shown in FIG. 10 (solid line) was observed, reaching a maximum of 560 ppm.

Example 20: The ratio of hydrogen peroxide to water (mass/mass) of 5 g of the sterilization particles obtained from Example 10 was 0.8. The sterilization particles were placed on a heating plate on a non-fluidizing state for 30 min at 70° C. and the ratio increased to 2.3.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A sterilization particle, comprising:
   a porous carrier material comprising at least one of the following: a microporous material, a mesoporous material, a macroporous material, or a combination thereof; and
   a sterilization material contained in pores of the porous carrier material or adsorbed on a surface of the porous carrier material so as to be released as a gas into surroundings of the sterilization particle without the sterilization particle contacting water, wherein the sterilization material comprises at least 4 weight percent of the sterilization particle.

2. The sterilization particle of claim 1, wherein the sterilization material comprises at least one of the following: hydrogen peroxide, peracid, ozone, or a combination thereof.

3. The sterilization particle of claim 1, wherein the sterilization material comprises at least 10 weight percent of the sterilization particle.

4. The sterilization particle of claim 1, wherein the porous carrier material comprises at least one of the following: silica-based material, silica-alumina, alumina, or a combination thereof.

5. The sterilization particle of claim 4, wherein the silica-based material comprises a silica gel.

6. The sterilization particle of claim 1, further comprising a stabilizer.

7. The sterilization particle of claim 1, wherein the sterilization material is loaded into the pores as a gas.

8. The sterilization particle of claim 7, wherein a partial pressure of the sterilization material in the gas is at least 0.1 mmHg.

9. The sterilization particle of claim 1, wherein the sterilization material is contained in the pores so as to be released from the pores and into the surroundings of the sterilization particle at a temperature below 120° C.

10. The sterilization particle of claim 1, wherein the sterilization material is contained in the pores so as to be released from the pores and into the surroundings of the sterilization particle at an absolute pressure lower than normal atmospheric pressure.

11. The sterilization particle of claim 1, wherein the sterilization material is contained in the pores so as to be released from the pores and into the surroundings of the sterilization particle at normal atmospheric pressure.

12. The sterilization particle of claim 1, wherein the porous carrier material comprises a recycled porous carrier material.

13. A sterilization device containing the sterilization particle of claim 1.

14. A method of preparing a sterilization particle, comprising:
   providing a porous carrier material comprising at least one of the following: a microporous material, a mesoporous material, a macroporous material, or a combination thereof;
   exposing the porous carrier material to a gas comprising a gaseous sterilization material to form a sterilization particle, wherein the porous carrier material is exposed to the gaseous sterilization material under conditions sufficient to introduce the gaseous sterilization material into pores of the porous carrier material or to adsorb the gaseous sterilization material on a surface of the porous carrier material, such that the gaseous sterilization material comprises at least 4 weight percent of the sterilization particle; and releasing the gaseous sterilization material contained in the pores or adsorbed on the surface in the gas phase into surroundings of the sterilization particle without the sterilization particle being contacted with water.

15. The method of claim 14, wherein the porous carrier material in a fluidized state is exposed to the gaseous sterilization material in an open container under a continuous non-recirculating flow of the gaseous sterilization material, wherein a flow rate of the continuous non-recirculating flow is at least 0.1 $m^3$/h for up to 5 days.

16. The method of claim 14, wherein the porous carrier material in a non-fluidized state is percolated to the gaseous sterilization material in an open container under a continuous non-recirculating flow of the gaseous sterilization material, wherein a flow rate of the continuous non-recirculating flow is at least 0.1 $m^3$/h for up to 5 days.

17. The method of claim 14, wherein the porous carrier material is exposed to the gaseous sterilization material at a temperature of up to 200° C. for between from 6 hours and to 5 days.

18. The method of claim 14, further comprising drying the porous carrier material before exposing the porous carrier material to the gaseous sterilization material.

19. The method of claim 14, wherein the sterilization particle is heated to at least 37° C. for no less than 1 min, so the ratio of hydrogen peroxide to water is increased.

20. The sterilization particle of claim 1, wherein the sterilization particle is contained in a sterilization device so as to release the sterilization material from the porous carrier material and from the sterilization device and into the surroundings of the sterilization device so as to sterilize the surroundings.

* * * * *